United States Patent [19]

Lin et al.

[11] Patent Number: 5,651,026

[45] Date of Patent: Jul. 22, 1997

[54] ROBUST VECTOR QUANTIZATION OF LINE SPECTRAL FREQUENCIES

[75] Inventors: Daniel Lin, Montville, N.J.; Kumar Swaminathan, Gaithersburg, Md.

[73] Assignee: Hughes Electronics, Los Angeles, Calif.

[21] Appl. No.: 495,148

[22] Filed: Jun. 27, 1995

Related U.S. Application Data

[63] Continuation of Ser. No. 984,396, Dec. 2, 1992, abandoned, which is a continuation-in-part of Ser. No. 905,992, Jun. 25, 1992, which is a continuation-in-part of Ser. No. 891,596, Jun. 1, 1992.

[51] Int. Cl.$^6$ .............................. H04B 1/66; H04B 14/04
[52] U.S. Cl. .................... 375/240; 375/242; 395/2.31; 395/2.29; 348/422
[58] Field of Search ............................... 375/240, 241, 375/242, 243, 244, 250, 245, 254; 381/29–31, 36, 37, 39; 395/2.31, 2.32; 348/422, 384

[56] References Cited

U.S. PATENT DOCUMENTS

| | | | |
|---|---|---|---|
| 4,922,508 | 5/1990 | Moriya | 375/122 |
| 4,963,030 | 10/1990 | Makur | 358/133 |
| 5,119,423 | 6/1992 | Shiraki et al. | 395/2.32 |
| 5,271,089 | 12/1993 | Ozawa | 395/2.31 |

OTHER PUBLICATIONS

T. Taniguchi, F. Amano and S. Unagami, "Combined Source and Channel Coding based on Multimode Coding" International Conference on Acoustics, Speech and Signal Processing, vol. 1, No. S1, Apr. 1990, New York, pp. 477–480.

F. Fjällbrant, F. Mekuria and Weidong Kou, "A Voiced/Unvoiced Classified Vector Quantized Speech Transform Coder Implemented on a TMS 32020 Signal Processor" 1988 IEEE Proceedings of the International Symposium on Circuits and Systems—vol. 2, Jun. 1990, New York, pp. 1333–1336.

S. Vaseghi, "Finite State CELP for Variable Rate Speech Coding" International Conference on Acoustics, Speech, and Signal Processing International Conference on Acoustics, Speech, and Signal Processing, vol. 1, No. S1, Apr. 1990, New York, pp. 37–40.

K. Paliwal and B. Atal, "Efficient Vector Quantization 1PC Parameters at 24 Bits/Frame" IEEE Transaction on Speech and Audio Processing, vol. 1, No. 1 Jan. 1993, New York, pp. 661–664.

*Primary Examiner*—Stephen Chin
*Assistant Examiner*—Hai H. Phan
*Attorney, Agent, or Firm*—Gordon R. Lindeen, III; Wanda K. Denson-Low

[57] ABSTRACT

A line spectral frequency (LSF) vector quantizer, having particular application in digital cellular networks (DCN), is provided for code excited linear predictive (CELP) speech encoders. The LSF vector quantizer is efficient in terms of bits employed, robust and effective in terms of performance across speakers and handsets, moderate in terms of complexity, and accommodates effective and simple built-in transmission error detection schemes. The LSF vector quantizer employs a minimum number of bits, is of moderate complexity and incorporates built-in error detection capability in order to combat transmission errors. The LSF vector quantizer classifies unquantized line spectral frequencies into four categories, employing different vector quantization tables for each category. Each quantization table is optimized for particular types of vectors. For each category, three split vector codebooks are used with a simplified error measure to find three candidate split quantized vectors. The three sets of three split vectors are combined to produce as many as 27 vectors from each category. The quantizer then makes a final selection of optimal category using a more complex error measure to achieve the robust performance across speakers and handsets. Split vector quantization follows a two stage constrained search procedure that results in an ordered set of quantized line spectral frequencies that is "close" to the unquantized set with moderate complexity within each category. Effective and simple transmission error detection schemes at the receiver are made possible by the split nature of the vector quantization and the constrained search procedure. Only twenty-six bits are required to encode ten line spectral frequencies.

46 Claims, 3 Drawing Sheets

VOICED SPEECH PARTITION

UNVOICED SPEECH PARTITION

ROBUST VECTOR QUANTIZATION OF LINE SPECTRAL FREQUENCIES

CROSS REFERENCE TO RELATED APPLICATIONS

This is a continuation application Ser. No. 07/984,396, filed Dec. 2, 1992 abandoned, which is a continuation-in-part of patent application Ser. No. 07/905,992 filed Jun. 25, 1992, entitled "High Quality Low Bit Rate CELP-Based Speech Codec" which is a continuation-in-part of patent application Ser. No. 07/891,596 filed Jun. 1, 1992, entitled "CELP Excitation Analysis for Voiced Speech." The above-mentioned applications are assigned to the assignee of the present application, their priorities are hereby claimed and their disclosures are hereby incorporated by reference fully herein.

BACKGROUND OF THE INVENTION

1. Field of the Invention

The present invention generally relates to digital voice communications systems and, more particularly, to a line spectral frequency vector quantizer for code excited linear predictive (CELP) speech encoders which is efficient in terms of bits employed, robust and effective in terms of performance across speakers and handsets, moderate in terms of complexity, and accommodates effective and simple built-in transmission error detection schemes. Such devices are commonly referred to as "codec" for coder/decoder. The invention has particular application in digital cellular networks but may be advantageously used in any product line that requires speech compression for communications.

2. Description of the Prior Art

Cellular telecommunications systems in North America are evolving from their current analog frequency modulated (FM) form towards digital systems. A standard that uses a full rate 8.0 Kbps vector sum excited linear prediction (VSELP) speech coder, convolutional coding for error protection, differential quadrature phase shift keying (QPSK) modulations, and a time division, multiple access (TDMA) scheme has been adopted by the Telecommunication Industry Association (TIA). This is expected to triple the traffic carrying capacity of the cellular systems. In order to further increase its capacity by a factor of two, the TIA has begun the process of evaluating and subsequently selecting a half rate codec. For the purposes of the TIA technology assessment, the half rate codec along with its error protection should have an overall bit rate of 6.4 Kbps and is restricted to a frame size of 40 ms. The codec is expected to have a voice quality comparable to the full rate standard over a wide variety of conditions. These conditions include various speakers, influence of handsets, background noise, and channel conditions.

Codebook Excited Linear Prediction (CELP) is a technique for low rate speech coding. The basic technique consists of searching a codebook of randomly distributed excitation vectors for that vector which produces an output sequence (when filtered through pitch and linear predictive coding (LPC) short-term synthesis filters) that is closest to the input sequence. To accomplish this task, all of the candidate excitation vectors in the codebook must be filtered with both the pitch and LPC synthesis filters to produce a candidate output sequence that can then be compared to the input sequence. This makes CELP a very computationally-intensive algorithm, with typical codebooks consisting of 1024 entries, each 40 samples long. In addition, a perceptual error weighting filter is usually employed, which adds to the computational load. Fast digital signal processors have helped to implement very complex algorithms, such as CELP, in real-time, but the problem of poor quality at low bit rates persists. In order to incorporate codecs in telecommunications equipment, the voice quality needs to be comparable to the 8.0 Kbps digital cellular standard.

There are many representations of short term predictor parameters. A commonly used one is the set of line spectral frequencies. The quantization of the line spectral frequencies has been the subject of several investigations. Both scalar and vector quantizers have been designed for this purpose. Typically, the scalar quantizers need 36 to 40 bits to encode ten line spectral frequencies in order to meet the other objectives of good robust performance across speakers and handsets, moderate complexity, and built-in error detection capability. Efficiency in terms of bits needed is therefore sacrificed. Vector quantizers, on the other hand, achieve efficiency in terms of bits but at the expense of speaker or handset dependent performance and often at high complexity and without built-in error detection capability.

SUMMARY OF THE INVENTION

It is therefore an object of the present invention to provide a line spectral frequency vector quantizer which is robust, consistent and provides good quantization performance of short term parameters represented as line spectral frequencies across various speakers and handsets.

It is another object of the invention to provide an efficient line spectral frequency vector quantizer employing a minimum number of bits, of moderate complexity and incorporating built-in error detection capability in order to combat transmission errors.

According to the invention, there is provided a line spectral frequency vector quantizer which classifies unquantized line spectral frequencies into four categories, employing different vector quantization tables for each category, and final selection of optimal category to achieve a robust performance across speakers and handsets. The invention uses split vector quantization that follows a two stage constrained search procedure that results in an ordered set of quantized line spectral frequencies that is "close" to the unquantized set with moderate complexity within each category. Effective and simple transmission error detection schemes at the receiver are made possible by the split nature of the vector quantization and the constrained search procedure. The invention achieves all the desired objectives using only twenty-six bits to encode ten line spectral frequencies.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
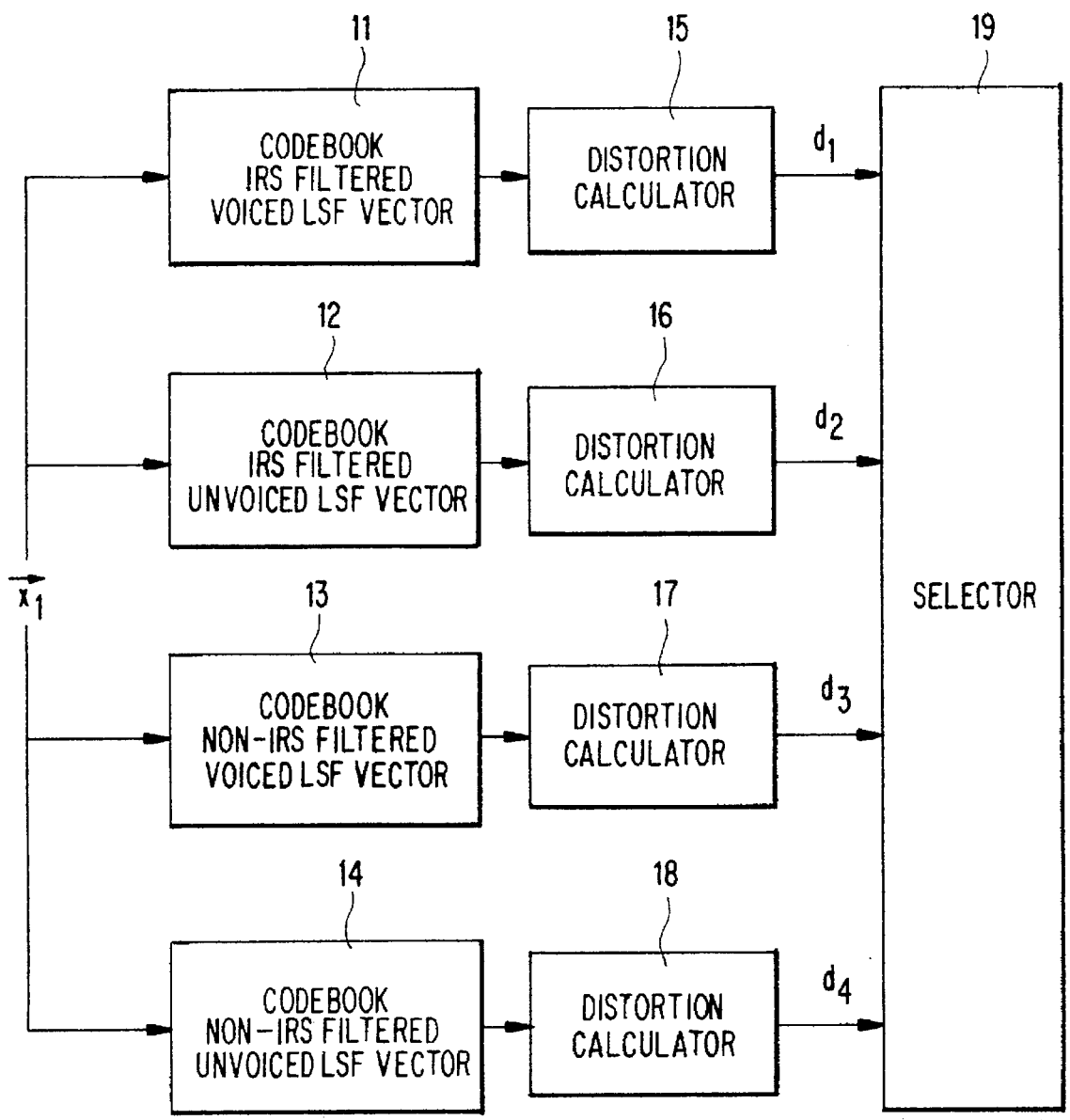
FIG. 1 is a functional block diagram showing the codebook search procedure at the transmitter to select candidate indices for the split vectors to be transmitted.

The subject invention is an improvement on vector quantization of speech signals. Shannon, in his classic work entitled "A Mathematical Theory of Communication", Bell System Technical Journal, vol. 27 (1948), showed that the most economical coding of information required a bit rate no greater than the entropy of the source and that this rate was to be achieved by coding large groups, or vectors, of samples rather than coding the individual samples. This is done using a codebook. To transmit a vector, one transmits only the index (i.e., address) of its entry in the codebook. The receiver has its own copy of the codebook and uses the address to recover the transmitted vector. The vector quantization of the codebook is not complete but contains a small, but representative, sample of the vectors actually encountered in the data to be encoded. Therefore, to transmit a sequence of samples, the most closely matching codebook entry is selected and its address is transmitted. The vector quantization approach has the advantage of a reduced bit rate but at the cost of distortion in the signal due to the mismatch between the actual vector and the selected entry in the codebook.

In the construction of the codebook, the short term predictor filter coefficients of a speech frame of duration 10 to 30 milliseconds (ms) are obtained using conventional linear predictor analysis. A tenth order model is very common. These short term tenth order model parameters are updated at intervals of 10 to 30 ms. The quantization of these parameters is usually carried out in a domain where the spectral distortion introduced by the quantization process is perceived to be minimal for a given number of bits. One such domain is the line spectral frequency domain. A valid set of line spectral frequencies is necessarily an ordered set of monotonically increasing frequencies. The complexity of conversion of the short term predictor parameters to line spectral frequencies depends on the degree of resolution required. Little loss of performance has been observed using this vector quantization scheme even with 40 Hz resolution. The ten line spectral frequencies are quantized and encoded using twenty-six bits by the vector quantizer according to the preferred embodiment of the invention. After quantization, the ten quantized line spectral frequencies are converted back to short term predictor filter coefficients.

Split vector quantization is used to reduce the size of the codebook. The twenty-six bits used by the vector quantizer comprise twenty-four bits to encode the spectral frequencies and two bits to encode the optimum category. If the ten spectral frequencies are represented as a vector having elements $x_1, x_2, x_3, x_4, x_5, x_6, x_7, x_8, x_9, x_{10}$, ordered from lowest value $x_1$ to highest value $x_{10}$, a codebook representing the set of all vectors encoded with twenty-four bits would have $2^{24}$ entries. By splitting the vectors into ordered three subsets, say, $(x_1, x_2, x_3)$, $(x_4, x_5, x_6)$, and $(x_7, x_8, x_9, x_{10})$, referred to herein after as a 3-3-4 split vector, each encoded with eight bits, three codebooks each having $2^8$ or 256 entries would be required, resulting in considerable economies in implementing the codebook.

In its basic form, the vector quantization scheme employed by the invention uses four separate vector quantization tables for the following categories of unquantized line spectral frequencies (LSF):

1. IRS filtered voiced LSF vector
2. IRS filtered unvoiced LSF vector
3. non-IRS filtered voiced LSF vector
4. non-IRS filtered unvoiced LSF vector The IRS (Intermediate Reference System) filter is a linear phase FIR (Finite-duration Impulse Response) filter used to model the high pass filtering effects of handset transducer and whose magnitude response conforms to the recommendations of CCITT. For the first and third categories, a 3-4-3 split vector quantization is employed using 8-, 10- and 6-bit codebooks. For the second and fourth categories, a 3-3-4 split vector quantization is employed using 7-, 8- and 9-bit codebooks. Two bits are used to encode the optimum category. Thus, a total of twenty-six bits are spent on encoding the ten line spectral frequencies.

Referring now to the drawings, the vector quantization begins by determining the set of ordered line spectral frequencies from the vector quantization tables corresponding to each category that is "closest" to the unquantized line spectral frequencies. This is accomplished in a two stage manner. In the first stage, shown in FIG. 1, the first split vector entry from the corresponding vector quantization table which is closest in the weighted mean square sense to the unquantized line spectral frequencies is determined. More specifically, the first split vector, here represented as $\vec{x}_1$, is applied to each of codebooks 11, 12, 13, and 14, for IRS filtered voiced LSF vector, IRS filtered unvoiced LSF vector, non-IRS filtered voiced LSF vector, and non-IRS filtered unvoiced LSF vector, respectively. The outputs of the respective codebooks are then subjected to distortion calculations in blocks 15, 16, 17, and 18, respectively. The distortion, d, calculation is a mean square computation, $$\sum_{i=1}^{3} (x_i - \hat{x}_{ij})^2 = d,$$

where $j=1, \ldots, N$, and N is the number of elements in the codebook. Thus, each codebook search and distortion calculation produces a measure of distortion, d, which is applied to selector 19. The index and codebook producing the lowest distortion, i.e., representing the closest selection is recorded for the first split vector, $\vec{x}_1$. The second and third closest are also recorded.

The second split vector entries are searched in a similar fashion to produce the best three candidates. However, a constraint is imposed on the search so that at least one of the nine combinations of candidates is an ordered set. This is a very mild constraint that results in minor penalty both in terms of performance or complexity. The third split vector entries are searched in a similar fashion subject to the same constraint. The three best candidates from this search are also recorded. In the specific example of three split vectors with three split candidates each, there are now a total of twenty-seven combinations of candidates; however, the imposition of the constraint that at least one of the combinations of candidates be an ordered set means that there will be a number M combinations of candidates, where M is less than twenty-seven.

Figure 2:
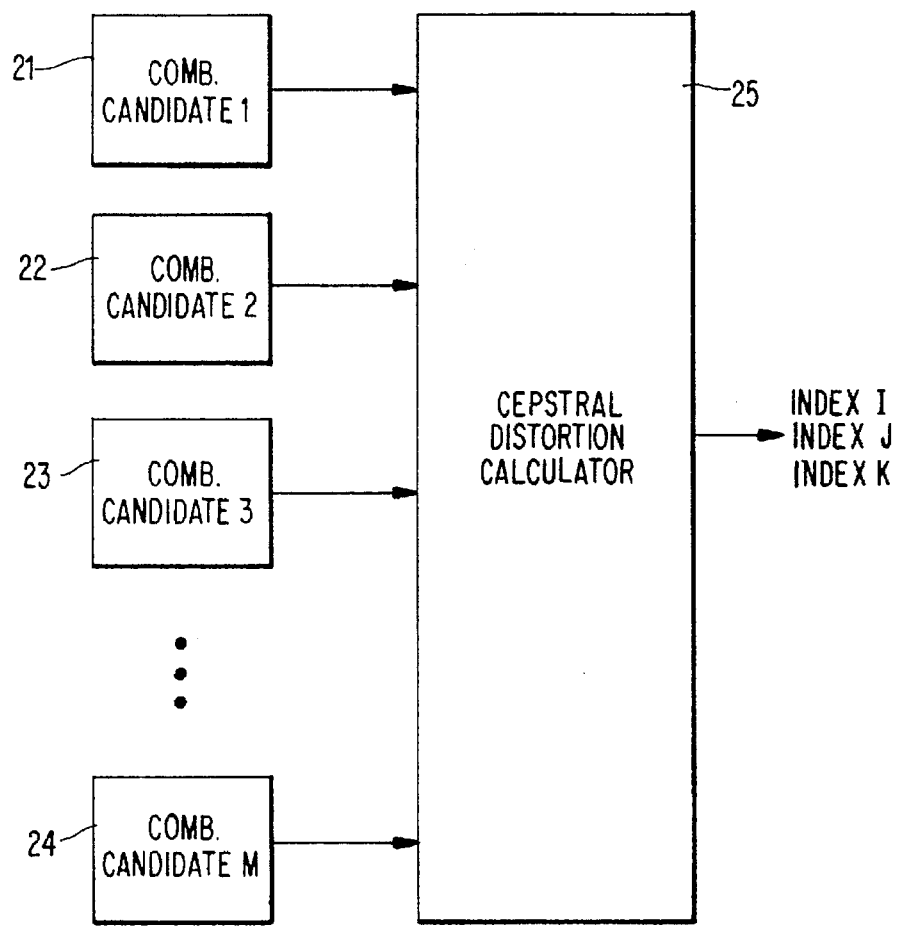
FIG. 2 is a functional block diagram showing the constrained selection process for selecting the lowest distortion split vector sequences for transmission.

In the second stage, shown in FIG. 2, the M combinations of complete quantized line spectral frequency vectors are compared to the unquantized line spectral frequencies using the cepstral distortion measure, and the optimal quantized line spectral frequency vector is determined. As mentioned, only those combinations that result in an ordered set of line spectral frequencies are considered in the second stage.

There is at least one such combination because of the constraint imposed during the search of the second and third split vectors. The mean square error distortion measure used in the first stage is computationally simple and is therefore appropriate for pruning the list of candidate quantized LSF vectors to be searched using the more effective but more computationally complex cepstral distortion measure in the second stage. In FIG. 2, the M combinations of candidates, represented by blocks 21, 22, 23, and 24, are input to the cepstral distortion calculation 25.

The calculation is sometimes made using a double Fourier transform. More specifically, the speech spectrum is the product of the excitation spectrum, which for voiced speech consists of a train of harmonics, and the transform of the vocal-tract transfer function, which is a relatively smooth function of frequency. If the logarithm of the spectrum is taken, in order to make the excitation and transfer-function components additive, and the logged spectrum transformed again, there is obtained $$F[1nS(\omega)]=F[1nH(\omega)]+F[1nF(\omega)].$$

Such a transform was named "cepstrum" (from "spectrum" by reversing the first four letters) by D. P. Bogert et at. in "The quefrency alanysis of time series for echoes: cepstrum, pseudo-autocovariance, cross-cepstrum, and saphe cracking", Proc. Symp. Time Series Analysis, pp. 209–243 (1963).

The double Fourier transform calculation of the cepstrum is computationally complex. The preferred embodiment of the invention therefore uses a cepstral distance, $d_{cep}$, calculation in the form of a mean square calculation, similar to that performed by the distortion calculators in FIG. 1. More particularly, the cepstral distortion calculator 25 makes the following calculation:

$$\sum_{i=1}^{k} (c_i - \hat{c}_i)^2 = d_{cep},$$

where $c_i$ are the cepstral coefficients as described by A. H. Gray, Jr., and J. D. Markel in "Distance Measures for Speech Processing", IEEE Transactions on Acoustics, Speech, and Signal Processing, vol. ASSP-24, no. 5, October 1976, pp. 380 et seq. The output of block 25 is the candidate combination having the least distortion, here represented by index I, index J and index K. Thus, in the final stage shown in FIG. 2, the optimum category is determined as that whose optimal quantized LSF vector has the lowest cepstral distortion when compared to the original unquantized LSF vector. The twin objectives of good performance and moderate complexity are therefore met by this two stage approach.

The complete quantized LSF vector is obtained from the optimal indices corresponding to each of the three split vectors by concatenating the corresponding vector entries. Such a vector is guaranteed to be ordered. At the receiver, if the reconstructed quantized LSF vector were not ordered, then an error in the transmission of the three optimal vector quantization indices would have been detected. This simple error detection capability of this vector quantization scheme is made possible because of the constraints imposed during the search and is made effective because of its three-split nature.

In a preferred implementation of the invention, the vector quantization tables are designed using a variation of the standard LBG algorithm using a large database of over fifty talkers. The average log spectral distortion over all frequencies from 0–4 Khz that was measured using this vector quantization scheme is 1.3 Db over both IRS filtered and non-IRS filtered speech database.

Figure 3:
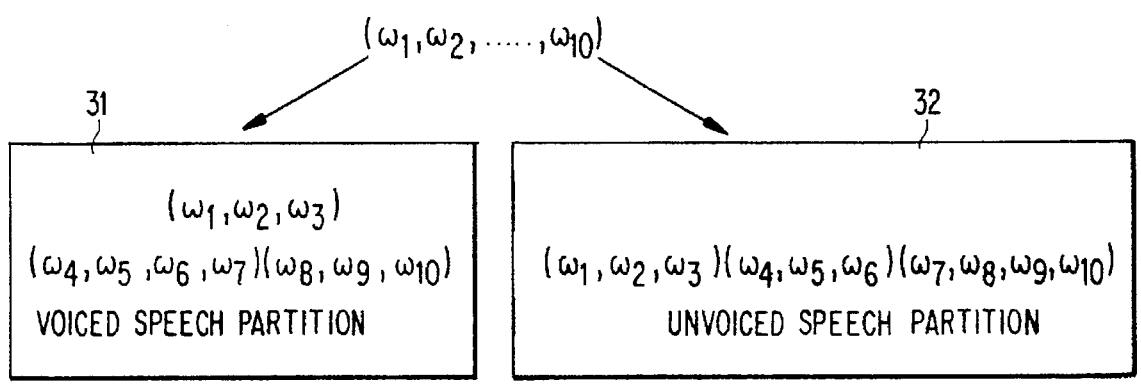
FIG. 3 is a block diagram showing a preferred implementation of the invention using 3-4-3 and 3-3-4 split vector quantizations for voiced speech and unvoiced speech partitions, respectively.

FIG. 3 is a block diagram showing a specific implementation according to a preferred embodiment of the invention. A split band partition 31 of LSFs as 3-4-3 split vector quantization is used for voiced speech; i.e., IRS and non-IRS filtered voiced LSF vectors. A split band partition 32 of LSFs as 3-3-4 split vector quantization is used for unvoiced speech; i.e., IRS and non-IRS filtered unvoiced LSF vectors.

Figure 4A:
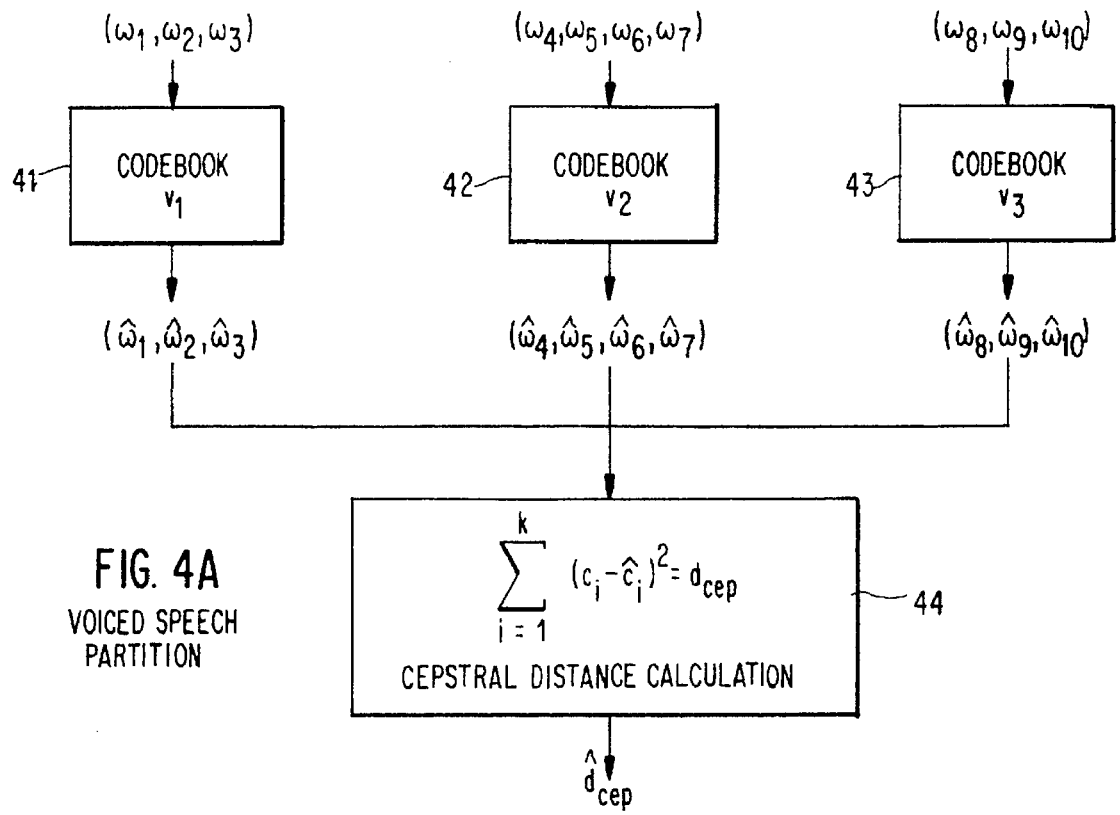
FIG. 4A is a block diagram showing the search procedure for the 3-4-3 voiced speech partition search.
Figure 4B:
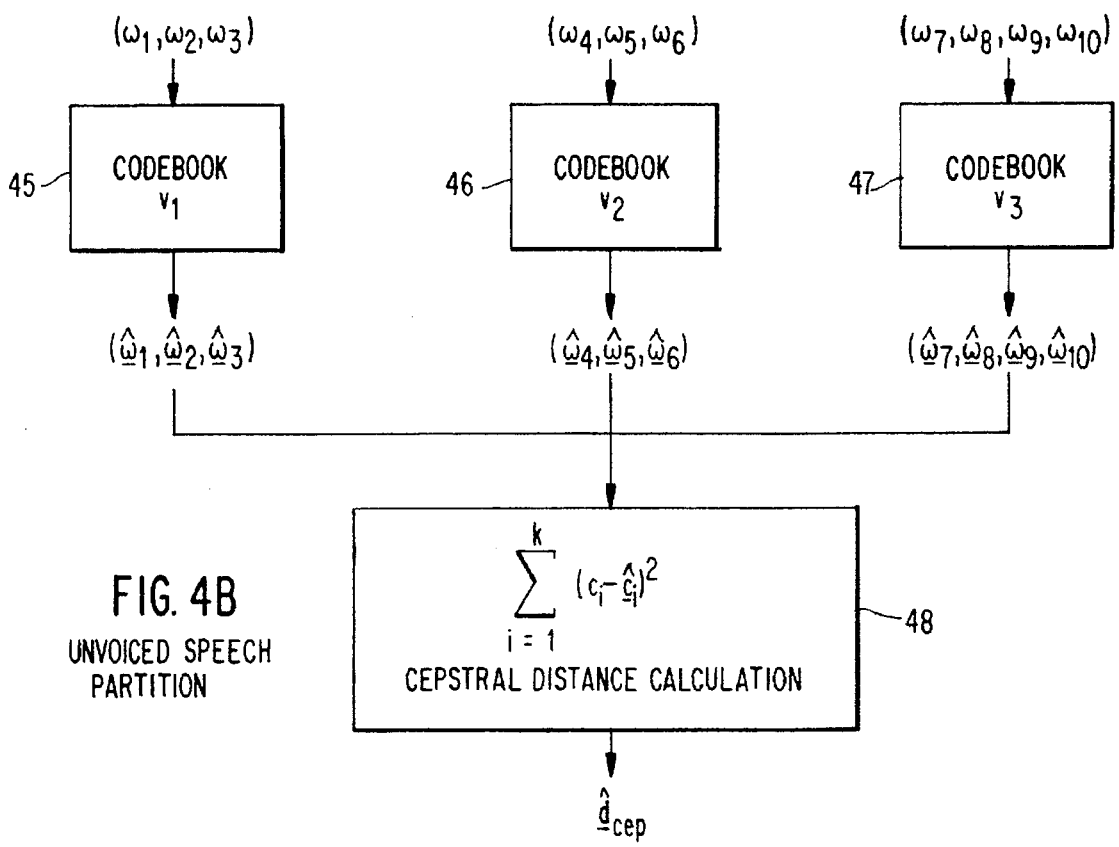
FIG. 4B is a block diagram showing the search procedure for the 3-3-4 unvoiced speech partition.

The split band partition 31 is subjected to the codebook search procedure shown in FIG. 4A, whereas the split band partition 32 is subjected to the codebook search shown in FIG. 4B. Referring first to FIG. 4A, the first split vector $w_1$, $w_2$, $w_3$ is searched in codebook 41 to generate combination candidates $\hat{w}_1$, $\hat{w}_2$, $\hat{w}_3$, the second split vector $w_4$, $w_5$, $w_6$, $w_7$, is searched in codebook 42 to generate combination candidates $\hat{w}_4$, $\hat{w}_5$, $\hat{w}_6$, $\hat{w}_7$, and the third split vector $w_8$, $w_9$, $w_{10}$ is searched in codebook 43 to generate combination candidates $\hat{w}_8$, $\hat{w}_9$, $\hat{w}_{10}$, as generally described with reference to FIG. 1. The combination candidates are then subjected to cepstral distance calculation in block 44 to produce the cepstral distance, $\hat{d}_{cep}$, for the voiced partition. Similarly, in FIG. 4B, the first split vector $w_1$, $w_2$, $w_3$ is searched in codebook 45 to generate combination candidates $\underline{\hat{w}}_1$, $\underline{\hat{w}}_2$, $\underline{\hat{w}}_3$ (where the underlining is used to distinguish from the combination candidates generated by codebook 41), the second split vector $w_4$, $w_5$, $w_6$ is searched in codebook 46 to generate combination candidates $\underline{\hat{w}}_4$, $\underline{\hat{w}}_5$, $\underline{\hat{w}}_6$, and the third split vector $w_7$, $w_8$, $w_9$, $w_{10}$ is searched in codebook 47 to generate combination candidates $\underline{\hat{w}}_7$, $\underline{\hat{w}}_8$, $\underline{\hat{w}}_9$, $\underline{\hat{w}}_{10}$. The combination candidates are then subjected to cepstral distance calculation in block 48 to produce the cepstral distance, $\underline{\hat{d}}_{cep}$, for the unvoiced partition.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for quantizing line spectral frequency (LSF) vectors in a digital communications system comprising:

receiving an unquantized LSF vector;

searching each of a plurality of specialized codebooks and selecting from each of the plurality of specialized codebooks, a candidate quantized LSF vector resembling the unquantized LSF vector;

calculating a distortion measure for each of the candidate quantized LSF vectors using the unquantized LSF vector; and selecting a quantized LSF vector from among the candidate quantized LSF vectors using the calculated distortion measures for each candidate quantized LSF vector.

2. The method of claim 1, wherein each specialized codebook comprises a plurality of specialized split codebooks, and wherein the step of searching each of the plurality of specialized codebooks comprises:

splitting the unquantized LSF vector into a plurality of unquantized split LSF vectors;

for each specialized codebook, searching each of the corresponding plurality of specialized split codebooks and selecting candidate quantized split LSF vectors resembling the corresponding unquantized split LSF vectors; and combining the candidate quantized split LSF vectors to produce the candidate quantized LSF vectors.

3. The method of claim 2 wherein the step of searching each of the plurality of specialized codebooks comprises, after the step of searching each of the plurality of specialized split codebooks:

calculating a second distortion measure for each candidate quantized split LSF vector using the corresponding unquantized split LSF vector;

selecting a subset of candidate quantized split LSF vectors from among the candidate quantized split LSF vectors using the second distortion measure for each candidate split LSF vector; and wherein the step of combining the candidate split LSF vectors comprises combining candidate split LSF vectors from among the subset of candidate quantized split LSF vectors so as to produce a plurality of unsplit candidate quantized LSF vectors.

4. The method of claim 3, wherein the step of combining the candidate split LSF vectors comprises combining split LSF vectors obtained from a split codebook corresponding to a first type of specialized codebook only with candidate split LSF vectors obtained from other split codebooks corresponding to the same first type.

5. The method of claim 3 wherein the second distortion measure calculated for a candidate quantized split LSF vector comprises a mean square calculation between the candidate quantized split LSF vector and the corresponding unquantized split LSF vector.

6. The method of claim 3 wherein the second distortion measure comprises a less accurate distortion measure than the first distortion measure.

7. The method of claim 1 wherein the distortion measure calculated for a candidate quantized LSF vector comprises a cepstral distance measurement between the candidate quantized LSF vector and the unquantized LSF vector.

8. The method of claim 1 wherein the specialized codebooks comprise a first codebook specialized for voiced speech and a second codebook specialized for unvoiced speech.

9. The method of claim 1 wherein the specialized codebooks comprise a first codebook specialized for filtered speech and a second codebook specialized for unfiltered speech.

10. The method of claim 9 wherein the first codebook is specialized for modeling the high pass filtering effects on speech of a telephone handset transducer.

11. The method of claim 2 wherein the plurality of unquantized split LSF vectors comprises three split unquantized split LSF vectors and wherein each plurality of specialized split codebooks comprises three specialized split codebooks for each specialized codebook.

12. A line spectral frequency (LSF) vector quantizer comprising:

an input for receiving an unquantized LSF vector;

a plurality of specialized codebooks of quantized (line spectral frequency) LSF vectors;

means coupled to the input for searching each of the specialized codebooks and selecting from each of the specialized codebooks, a candidate quantized LSF vector resembling the input unquantized (line spectral frequency) LSF vector;

means for calculating a distortion measure for each of the candidate quantized LSF vectors using the unquantized LSF vector; and means for selecting a quantized LSF vector from among the candidate quantized LSF vectors using the calculated distortion measures for each candidate quantized LSF vector.

13. The quantizer of claim 12 wherein each specialized codebook comprises a plurality of specialized split codebooks of candidate quantized split LSF vectors, and wherein the means for searching each of the plurality of specialized codebooks comprises:

means for splitting the unquantized LSF vector into a plurality of unquantized split LSF vectors;

for each specialized codebook, means for searching each of the corresponding plurality of specialized split codebooks and selecting candidate quantized split LSF vectors resembling the corresponding unquantized split LSF vectors; and means for combining the candidate quantized split LSF vectors to produce the candidate quantized LSF vectors.

14. The quantizer of claim 13 wherein the means for searching each of the plurality of specialized codebooks comprises:

means for calculating a second distortion measure for each candidate quantized split LSF vector using the corresponding unquantized split LSF vector;

means for selecting a subset of candidate quantized split LSF vectors from among the candidate quantized split LSF vectors using the second distortion measure for each candidate split LSF vector; and wherein the means for combining the candidate split LSF vectors comprises means for combining candidate split LSF vectors chosen from among the subset of candidate quantized split LSF vectors so as to produce a plurality of unsplit candidate quantized LSF vectors.

15. The quantizer of claim 14, wherein the means for combining the candidate split LSF vectors comprises means for combining candidate split LSF vectors obtained from a split codebook corresponding to a first type of specialized codebook only with candidate split LSF vectors obtained from other split codebooks corresponding to the same first type.

16. The quantizer of claim 14 wherein the second distortion measure calculated for a candidate quantized split LSF vector comprises a mean square calculation between the candidate quantized split LSF vector and the corresponding unquantized split LSF vector.

17. The quantizer of claim 16 wherein the second distortion measure comprises a less accurate distortion measure than the first distortion measure.

18. The quantizer of claim 12 wherein the distortion measure calculated for a candidate quantized LSF vector comprises a cepstral distance measurement between the candidate quantized LSF vector and the unquantized LSF vector.

19. The quantizer of claim 12 wherein the specialized codebooks comprise a first codebook specialized for voice speech and a second codebook specialized for unvoiced speech.

20. The quantizer of claim 12 wherein the specialized codebooks comprise a first codebook specialized for filtered speech and a second codebook specialized for unfiltered speech.

21. A method for quantizing line spectral frequency (LSF) vectors in a digital communications system comprising:

receiving an unquantized LSF vector;

splitting the unquantized LSF vector into a plurality of unquantized split LSF vectors;

searching a plurality of split codebooks for candidate quantized split LSF vectors resembling each of the unquantized split LSF vectors;

calculating a first distortion measure for each candidate quantized split LSF vector using the corresponding unquantized split LSF vector;

selecting a subset of candidate quantized split LSF vectors from among the candidate quantized split LSF vectors based on the first distortion measure calculated for each candidate quantized split LSF vector;

combining candidate quantized split LSF vectors chosen from among the subset of candidate quantized split LSF vectors so as to produce a plurality of unsplit candidate quantized LSF vectors;

calculating a second distortion measure for each of the unsplit candidate quantized LSF vectors using the unquantized LSF vector; and selecting a quantized LSF vector from among the unsplit candidate quantized LSF vectors using the second distortion measure calculated for each unsplit candidate quantized LSF vector.

22. The method of claim 21 wherein a specialized codebook comprises a plurality of split codebooks, and the step of searching each of the plurality of split codebooks comprises searching each of a plurality of specialized codebooks.

23. The method of claim 22 wherein the step of combining the candidate quantized split LSF vectors comprises combining candidate quantized split LSF vectors obtained from a split codebook corresponding to a first type of specialized codebook only with candidate quantized split LSF vectors obtained from other split codebooks corresponding to the same first type.

24. The method of claim 21, wherein the first distortion measure comprises a mean square calculation between each candidate quantized split LSF vector and the corresponding unquantized split LSF vector.

25. The method of claim 21 wherein the first distortion measure comprises a less accurate distortion measure than the second distortion measure.

26. The method of claim 21 wherein the second distortion measure comprises a cepstral distance measurement between each unsplit candidate quantized LSF vector and the unquantized LSF vector.

27. The method of claim 22 wherein the specialized codebooks comprise a first codebook specialized for voiced speech and a second codebook specialized for unvoiced speech.

28. The method of claim 22 wherein the specialized codebooks comprise a first codebook specialized for filtered speech and a second codebook specialized for unfiltered speech.

29. The method of claim 28 wherein the first codebook is specialized for modeling high pass filtering effects of a telephone handset transducer on speech.

30. The method of claim 22 wherein the plurality of split LSF vectors comprises three split LSF vectors and wherein each plurality of specialized split codebooks comprises three split codebooks for each specialized codebook.

31. A line spectral frequency (LSF) quantizer comprising:
a plurality of split codebooks of quantized split LSF vectors;
an input for receiving an unquantized LSF vector;
means for splitting the unquantized LSF vector into a plurality of unquantized split LSF vectors;
means coupled to the input for searching the plurality of split codebooks for candidate quantized split LSF vectors resembling each of the unquantized split LSF vectors;
means for calculating a first distortion measure for each candidate quantized split LSF vector using the corresponding unquantized split LSF vector;

means for selecting a subset of candidate quantized split LSF vectors from among the candidate quantized split LSF vectors based on the first distortion measure calculated for each candidate quantized split LSF vector;

means for combining candidate quantized split LSF vectors chosen from among the subset of candidate quantized split LSF vectors so as to produce a plurality of unsplit candidate quantized LSF vectors;

means for calculating a second distortion measure for each of the unsplit candidate quantized LSF vectors using the unquantized LSF vector; and means for selecting a quantized LSF vector from among the unsplit candidate quantized LSF vectors using the second distortion measure calculated for each unsplit candidate quantized LSF vector.

32. The quantizer of claim 31 wherein a specialized codebook comprises a plurality of split codebooks, and means for searching the plurality of split codebooks comprises means for searching each of a plurality of specialized codebooks.

33. The quantizer of claim 32 wherein the means for combining the candidate quantized split LSF vectors combines candidate quantized split LSF vectors obtained from a split codebook corresponding to a first type of specialized codebook only with candidate quantized split LSF vectors obtained from other split codebooks corresponding to the same first type.

34. The quantizer of claim 37 wherein the first distortion measure comprises a mean square calculation between each candidate quantized split LSF vector and the corresponding unquantized split LSF vector.

35. The quantizer of claim 31 wherein the first distortion measure comprises a less accurate distortion measure than the second distortion measure.

36. The quantizer of claim 31 wherein the second distortion measure comprises a cepstral distance measurement between each unsplit candidate quantized LSF vector and the unquantized LSF vector.

37. The quantizer of claim 32 wherein the specialized codebooks comprise a first codebook specialized for voiced speech and a second codebook specialized for unvoiced speech.

38. The quantizer of claim 32 wherein the specialized codebooks comprise a first codebook specialized for filtered speech and a second codebook specialized for unfiltered speech.

39. A method for quantizing line spectral frequency (LSF) vectors in a digital communications system comprising:
receiving an unquantized LSF vector;
splitting the unquantized LSF vector into first, second and third unquantized split LSF vectors;
searching a plurality of split codebooks for candidate quantized split LSF vectors most closely resembling each of the first, second and third unquantized split LSF vectors;
calculating a first distortion measure for each of the first, second and third candidate quantized split LSF vectors using the corresponding unquantized split LSF vector;
selecting a first, second and third quantized split LSF vectors from among the candidate quantized split LSF vectors based on the first distortion measure calculated for each candidate split LSF vector;
combining candidate quantized split LSF vectors chosen from among the first, second and third quantized split LSF vectors so as to produce a plurality of unsplit candidate quantized LSF vectors;

calculating a cepstral distortion measure for each of the unsplit candidate quantized LSF vectors using the unquantized LSF vector; and selecting a quantized LSF vector from among the unsplit candidate quantized LSF vectors using the cepstral distortion measure calculated for each unsplit candidate quantized LSF vector.

40. The method of claim 39 wherein the step of combining candidate quantized split vectors is performed such that at least one of the combinations of candidates is an ordered set.

41. The method of claim 39 wherein the plurality of codebooks includes four split codebooks.

42. The method of claim 41 wherein:

a first of said four split codebooks comprises filtered voiced LSF vectors;

a second of said four split codebooks comprises filtered unvoiced LSF vectors;

a third of said four split codebooks comprises unfiltered voiced LSF vectors; and a fourth of said four split codebooks comprises unfiltered unvoiced LSF vectors.

43. A line spectral frequency (LSF) quantizer comprising:

a plurality of split codebooks of quantized split LSF vectors;

an input for receiving an unquantized LSF vector;

means for splitting the unquantized LSF vector into first, second and third unquantized split LSF vectors;

means coupled to the input for searching the plurality of split codebooks for candidate quantized split LSF vectors most closely resembling each of the first, second and third unquantized split LSF vectors;

means for calculating a first distortion measure for each of the first, second and third candidate quantized split LSF vectors using the corresponding unquantized split LSF vector;

means for selecting a first, second and third quantized split LSF vectors from among the candidate quantized split LSF vectors based an the first distortion measure calculated for each candidate split LSF vector;

means for combining candidate quantized split LSF vectors chosen from among the first, second and third quantized split LSF vectors so as to produce a plurality of unsplit candidate quantized LSF vectors;

means for calculating a cepstral distortion measure for each of the unsplit candidate quantized LSF vectors using the unquantized LSF vector; and means for selecting a quantized LSF vector from among the unsplit candidate quantized LSF vectors using the cepstral distortion measure calculated for each unsplit candidate quantized LSF vector.

44. The LSF quantizer of claim 43 wherein the means for combining candidate quantized split vectors combines at least one of the combinations of candidates as an ordered set.

45. The LSF quantizer of claim 43 wherein the plurality of codebooks includes four split codebooks.

46. The LSF quantizer of claim 43 wherein:

a first of said four split codebooks comprises filtered voiced LSF vectors;

a second of said four split codebooks comprises filtered unvoiced LSF vectors;

a third of said four split codebooks comprises unfiltered voiced LSF vectors; and a fourth of said four split codebooks comprises unfiltered unvoiced LSF vectors.

* * * * *